(12) United States Patent
Berman

(10) Patent No.: US 7,349,048 B1
(45) Date of Patent: Mar. 25, 2008

(54) METHOD AND APPARATUS FOR ADJUSTING LIGHT INTENSITY

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 294 days.

(21) Appl. No.: 11/013,580

(22) Filed: Dec. 16, 2004

(51) Int. Cl.
*G02F 1/1335* (2006.01)
(52) U.S. Cl. ............... 349/117; 349/96; 349/5; 349/9
(58) Field of Classification Search ........... 349/117, 349/96, 5, 9, 130, 141
See application file for complete search history.

(56) References Cited

U.S. PATENT DOCUMENTS

| | | | | |
|---|---|---|---|---|
| 5,187,603 | A * | 2/1993 | Bos .................... | 349/117 |
| 5,347,377 | A * | 9/1994 | Revelli et al. ........ | 349/193 |
| 5,412,500 | A * | 5/1995 | Fergason .............. | 349/76 |
| 2004/0008267 | A1* | 1/2004 | Chen et al. ........... | 348/229.1 |
| 2004/0051830 | A1* | 3/2004 | Kashima ............... | 349/115 |
| 2005/0099564 | A1* | 5/2005 | Wang et al. .......... | 349/130 |

* cited by examiner

*Primary Examiner*—Mike Qi
(74) *Attorney, Agent, or Firm*—Martine Penilla & Gencarella, LLP

(57) ABSTRACT

A variable retarder and linear polarizer are placed in series in a polarized light path. A transmission axis of the linear polarizer is parallel to an axis of a polarization of the polarized light. An amount of retardation dialed into the variable retarder causes an amount of the light to have a component with an amount of off axis polarization. The off-axis components do not pass the linear polarizer, causing a reduction in the brightness of the polarized light. The combined variable retarder and linear polarizer operate as a light shutter that may be utilized, for example, to increase contrast ratio and bit depth regardless of light level in a video projection system (e.g., LCoS light engines).

13 Claims, 4 Drawing Sheets

METHOD AND APPARATUS FOR ADJUSTING LIGHT INTENSITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to adjusting light intensity. The present invention is more particularly related to adjusting the light intensity of a polarized light beam and/or the intensity of light input to a kernel of a light engine or a light projection system.

2. Discussion of Background

An image can be specified by a variety of parameters that include Contrast Ratio (CR) and bit depth. In the following discussion, assume a bit depth of 8 bits. The image will contain 256 shades of gray. As illustrated in FIG. 1, Shade 255 is the maximum intensity bright state and shade 0 is the minimum intensity or blackest dark state that can be produced by the display. Note that the blackest dark state does not necessarily correspond to a condition of no-light in the image. Rather, it corresponds to the greatest reduction in input light intensity that the microdisplays can accomplish.

The CR is defined as: (Intensity of the bright state)/(Intensity of the dark state). The maximum CR of an image is (Intensity of shade 255)/(Intensity of shade 0).

Areas within a projected video image are made dark by driving corresponding microdisplay pixels to their darker shades of gray. That is, dark areas utilize only a portion of the full bit depth available from the microdisplay. The concept is illustrated, for example, by dark shades 110 in FIG. 1. A consequence is that there is a limited ability to render subtle shades of gray within dark areas. This effect is manifested as a "contouring" in the dark areas and is recognized as a visual artifact.

The limitation on rendering subtle shades of gray in dark areas may be addressed through the use of an adjustable iris. In this method, an iris is inserted into a light engine to control the amount of light incident on the microdisplays. When the content of the video image is bright, the iris is wide open and the corresponding image is bright. Within the bright image all 256 shades of gray can be utilized. When the content of the video image is dark, the diameter of the iris is reduced. In this way the brightness of the entire image is reduced.

The light levels of a projected image with an active light level input adjustment such as an iris are illustrated in FIG. 2. The microdisplays are still capable of modulating the full 256 shades of gray. Therefore, subtle shading of the dark state is possible. In addition, the blackness of the dark state has been reduced and the apparent CR 210 increases. The reason this is referred to as the apparent CR is that a different definition of CR is being used. Apparent CR=(Intensity of shade 255 in a bright frame)/(Intensity of shade 0 in a dark frame). Visual observation has demonstrated the validity of this definition of CR.

The conventional approach to implementing this type of light modulation scheme is to insert a mechanically adjustable iris into the light path of a light engine. Doing so may be accomplished without loss of intensity in the brightness of shade 255. In real time, an electronic circuit analyzes the content of the video image and an algorithm determines the appropriate light level and adjusts the diameter of the iris also in real time.

SUMMARY OF THE INVENTION

The present inventor has realized the need to improve the apparent contrast ratio of lighting and projection systems, and increase efficiency of implementing increased apparent contrast ratios. The present invention provides electro-optic shuttering to actively adjust the intensity of light utilized in the projection systems. The present invention increases the apparent contrast ratio of the video image projected by a light engine kernel, particularly kernels using microdisplays (or other light modulators) that manipulate polarized light. For example, a DLP, high temperature polysilicon (HTPS) or LCOS-based kernels. The present invention is also designed to maintain a full bit depth within an image regardless of the light level of the image.

In one embodiment, the present invention provides a shutter, comprising, a variable retarder, and a polarizer, wherein the polarizer is configured to reduce a maximum brightness of light passing through the retarder and polarizer by an amount proportional to an amount of retardation of the light caused by the variable retarder.

In another embodiment a liquid crystal shutter, comprising, a liquid crystal based variable retarder, and a linear polarizer placed in series with the variable retarder, wherein the liquid crystal shutter is positioned to adjust intensity of a light path used in a video light engine.

In yet another embodiment, the present invention is a method comprising the steps of inserting a liquid crystal shutter in at least one light path of a projection system and varying the shutter based on a brightness of an image being projected by the projection system.

Portions of both the device and method may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Several kernel and light engine designs manipulate polarized light. The illuminator in a high temperature polysilicon (HTPS) and, more specifically, a LCoS light engine is designed to produce polarized light. The present invention incorporates a liquid crystal shutter into a LCoS light engine for the purpose of light level control. It is incorporated in such a way as to introduce little loss of intensity in the brightness of shade 255. The following discussion applies to video projection systems, and particularly to those based on DLP, HTPS or LCoS microdisplays.

Figure 1:
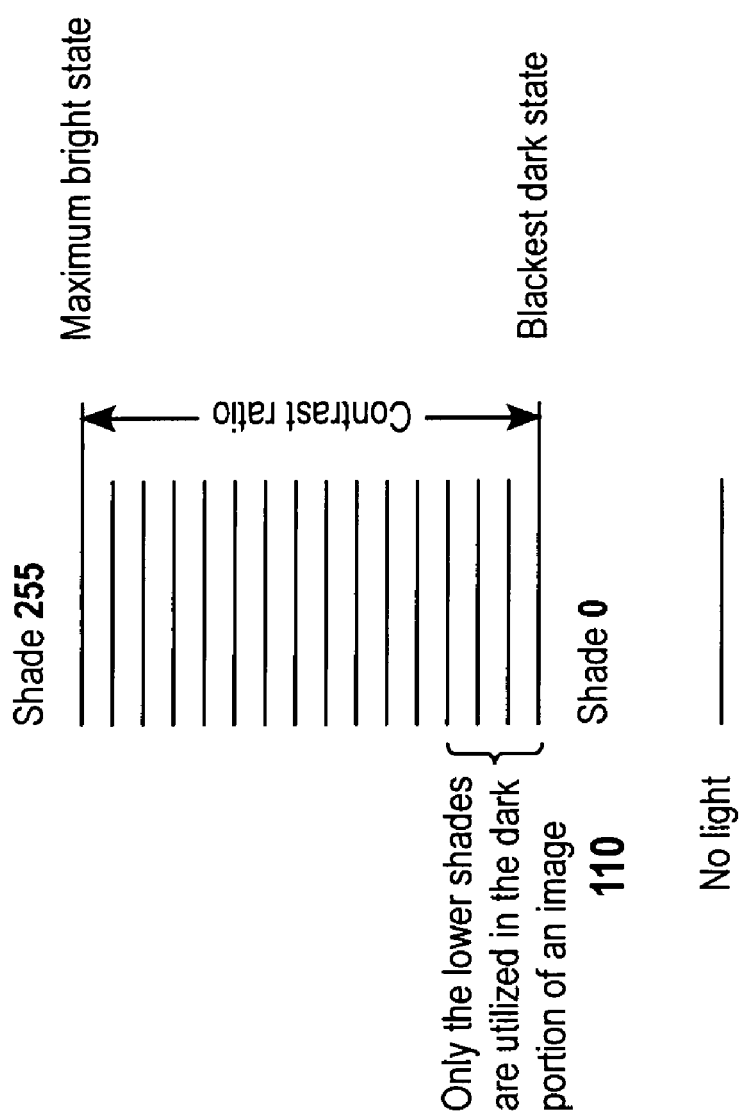
FIG. 1 is an illustration of light levels in a projected image.
Figure 2:
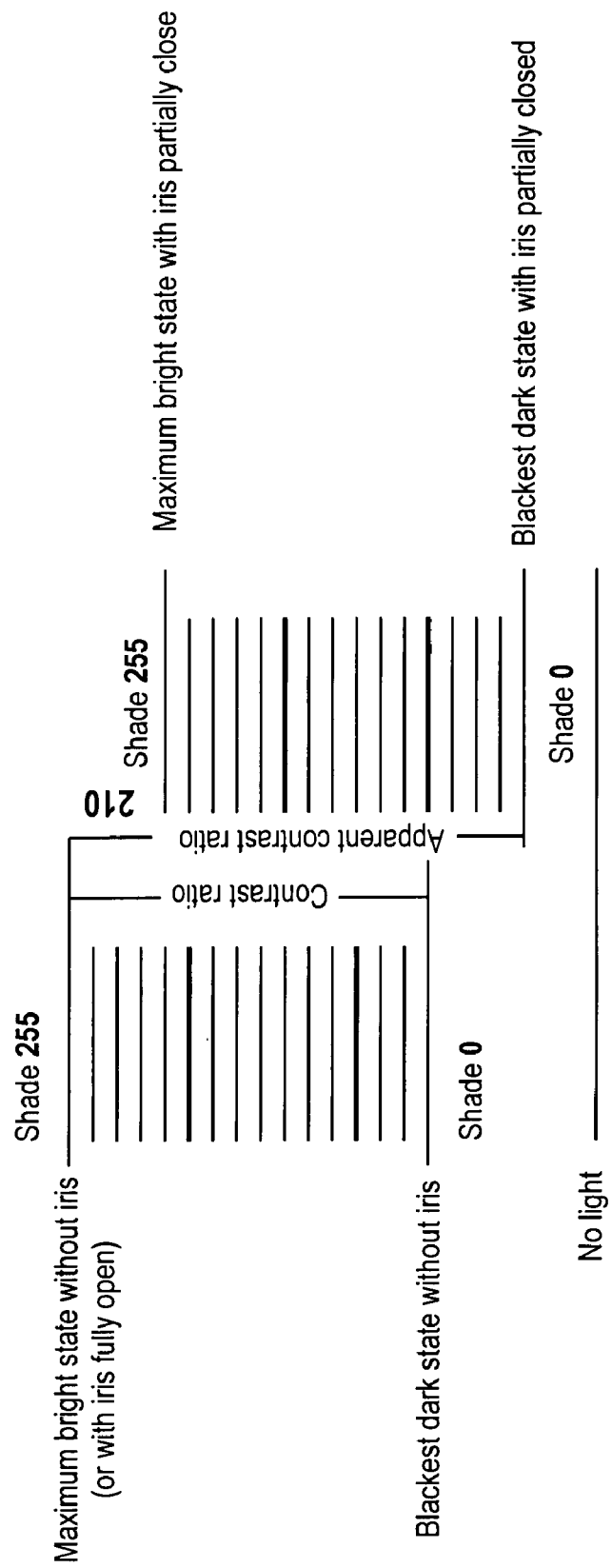
FIG. 2 is an illustration of light levels in a projected image with active light level adjustment.
Figure 3:
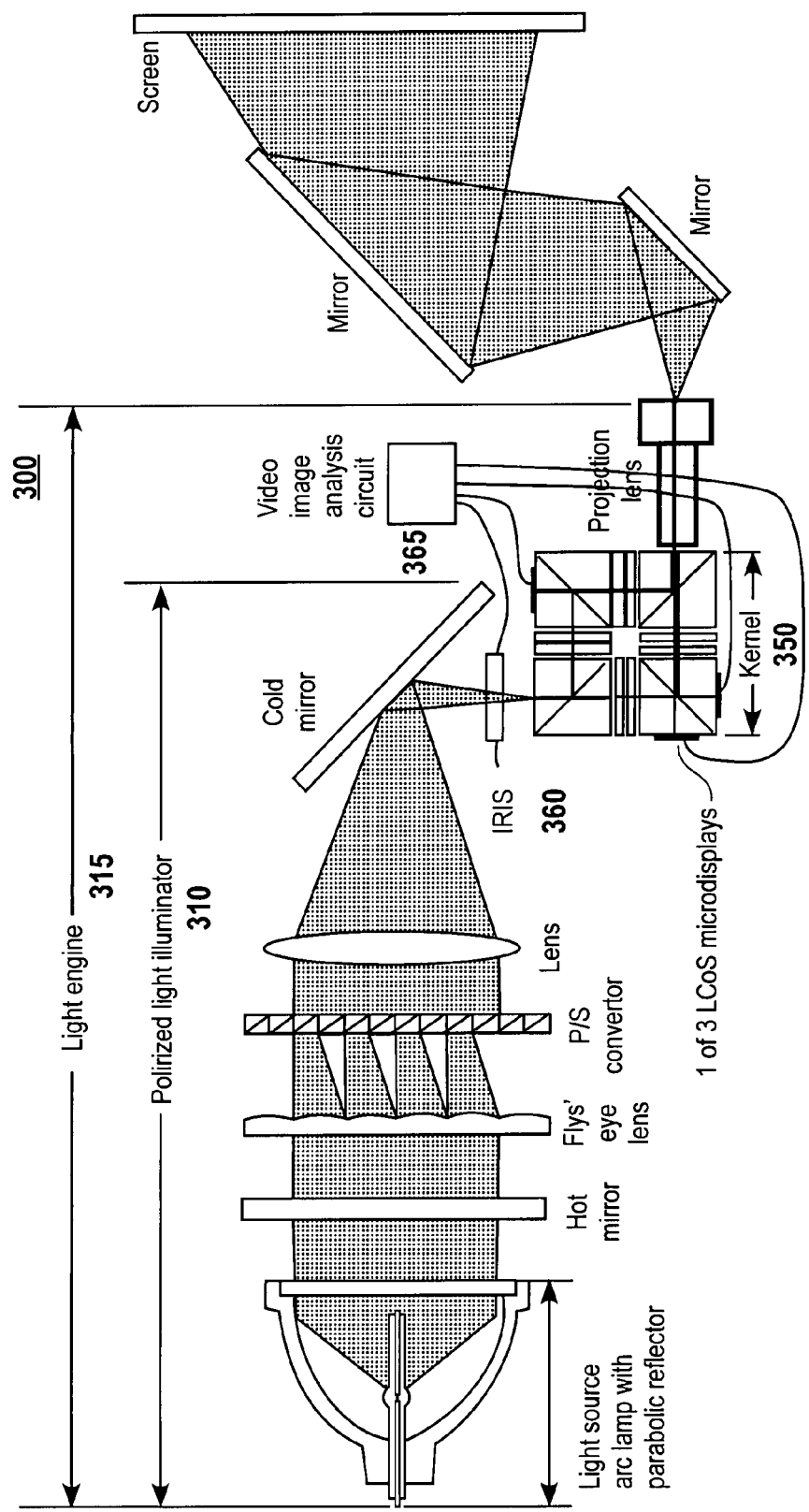
FIG. 3 is a drawing of a LCoS-based light engine.
Figure 4:
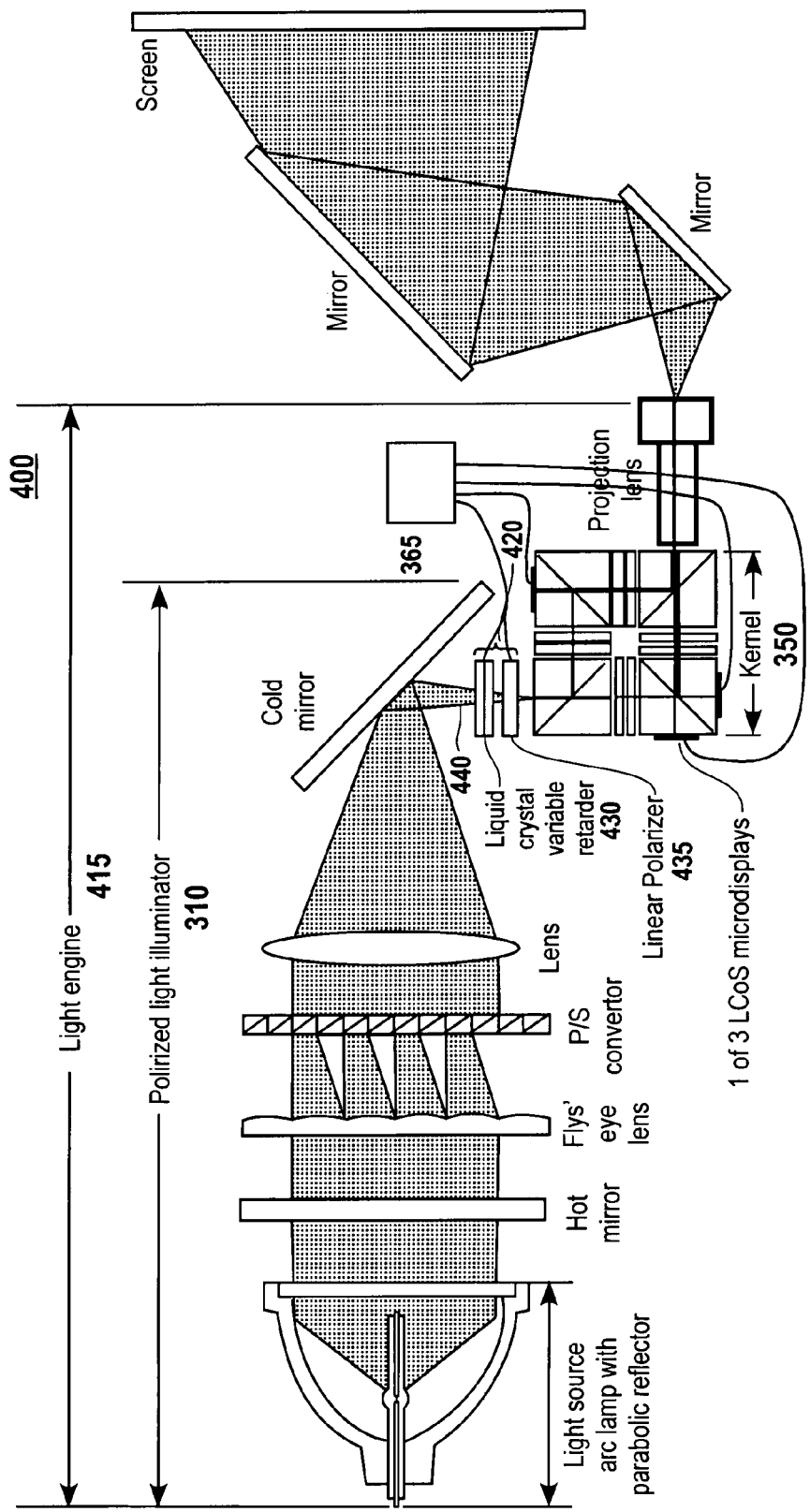
FIG. 4 is a drawing of a LCoS-based light engine with electro-optic light level control according to an embodiment of the present invention.

Referring again to the drawings, wherein like reference numerals designate identical or corresponding part, and more particularly to FIG. 3 thereof, there is illustrated a generic LCoS light engine 300. The LCoS light engine 300 includes an mechanical iris 360 in the light path of the light engine. The LCoS light engine 300 also includes an electronic circuit 365 that analyzes the content of the video image in real time. The video image analysis circuit 365 is coupled to and controls the amount of light that can pass through the mechanical iris 360 as determined by an algorithm in the video image analysis circuit. The illuminator 410 is typically designed to produce S polarized, linearly polarized light. FIG. 4 illustrates a modified light engine 400 that introduces a liquid crystal shutter 420.

As shown in FIG. 4, the liquid crystal shutter 420 includes a variable retarder 430 and a linear polarizer 435 have been inserted in the light path of the light engine 400 at the input to kernel 350. A transmission axis of the linear polarizer is parallel to an axis of a polarization of the input S polarized light 440. In this way there is little insertion loss. The variable retarder 430 is adjustable in varying degrees of retardation, and should be able to switch at least ½ lambda retardation. The axis of the retarder is, for example, set at 45 degrees to the axis of a polarization of the input S polarized light and the linear polarizer.

The variable retarder 430 is preferably a liquid crystal variable retarder. In one embodiment, the liquid crystal variable retarder is fabricated utilizing homeotropic alignment and a liquid crystal material with a negative dielectric anisotropy. Such a shutter will have essentially 0 lambda retardation in its unenergized state. In this state it will not effect the polarization of the input light which will go on to be transmitted through the linear polarizer 435 with little attenuation. As the shutter is energized it will develop retardation and the polarization of the light entering the polarizer 435 will be affected.

When the retardation is >0 but <¼ lambda, the light entering the linear polarizer 435 will be elliptically polarized with the major axis along the S polarization direction. The component of light polarized along the S direction will be transmitted by the linear polarizer. This portion will decrease from full transmission to half transmission as the retardation increases from 0 lambda to ¼ lambda. When the retardation=¼ lambda the light entering the linear polarizer 435 will be circularly polarized, and exactly half the light will be transmitted through the polarizer 435.

When the retardation is >¼ lambda but <½ lambda the light entering the polarizer will be elliptically polarized with its major axis along the P direction. As before, it is the component of light polarized along the S direction that will be transmitted by the linear polarizer. This portion will decrease from half transmission to zero transmission as the retardation increases from ¼ lambda to ½ lambda. When the retardation=½ lambda the light will again be linearly polarized but now in the P direction. Transmission through the linear polarizer 435 will be 0.

In one embodiment, the liquid crystal variable retarder is fabricated with homogeneous alignment and a liquid crystal material with a positive dielectric anisotropy. In this case a cell gap in the retarder is chosen such that, in the unenergized state, the retardation is at least ½ lambda. This type of retarder will have 0 transmission in the unenergized state and full transmission in the fully energized state.

The linear polarizer and the variable retarder can be separate components included at variable, and not necessarily adjacent, locations in the light engine. Alternatively, the components can be integrated into and made part of the kernel.

In describing the preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing any of a microdisplay, liquid crystal retarder, polarizer, etc, any other equivalent device, or other device having an equivalent function or capability, whether or not listed herein, may be substituted therewith. Furthermore, the inventor recognizes that newly developed technologies not now known may also be substituted for the described parts and still not depart from the scope of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, CDRW+/−, micro-drive, and magneto-optical disks, ROMs, RAMs, EPROMs, EEPROMs, DRAMs, VRAMs, flash memory devices (including flash cards, memory sticks), magnetic or optical cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, evaluating brightness in image data, preparing one or more electronic shutter signals, setting electronic shutter(s), preparing light modulator signals based on electronic controlled shutter positions, and the display, storage, or communication of results according to the processes of the present invention.

The present invention may suitably comprise, consist of, or consist essentially of, any of element (the various parts or features of the invention, and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A shutter, comprising:
    a variable retarder wherein the variable retarder includes a retarder transmission axis;
    a polarizer wherein the polarizer is placed in a series with an output light path of the variable retarder and wherein the polarizer includes a polarizer transmission axis parallel to an axis of polarization of an input S polarized light input to an input of the variable retarder and wherein the retarder transmission axis is set at selected angle to the polarizer transmission axis; and
    an electronic video image analyzer circuit coupled to the variable retarder and polarizer and including circuitry to adjust the retarder to a variable amount of retardation between a fully unenergized state and a fully energized state wherein the variable retardation varies between 0 lambda retardation and ½ lambda retardation in correlation to a contrast ratio of a current video image.

2. The shutter according to claim 1, wherein the polarizer is a linear polarizer.

3. The shutter according to claim 1, wherein the variable retarder is fabricated utilizing homeotropic alignment and a liquid crystal material with a negative dielectric anisotropy.

4. The shutter according to claim 1, wherein:
    the variable retarder comprises a cell gap having the liquid crystal material dispersed therein; and
    the cell gap is set such that, in an unenergized state, a retardation of the variable retarder is approximately ½ lambda or greater.

5. The shutter according to claim 1, wherein said shutter is installed at an input of a kernel in a light engine.

6. The shutter according to claim 5, wherein the light engine is part of a Liquid Crystal on Silicon projection television.

7. The shutter according to claim 5, wherein the shutter is installed in a light engine of a projection display comprising at least one of high temperature polysilicon, Digital Light Processing (DLP), and Liquid Crystal on Silicon (LCoS) technologies.

8. The shutter according to claim 1, wherein the shutter is installed in package including a light modulator.

9. The shutter according to claim 8, wherein the light modulator comprises one of high temperature polysilicon, Digital Light Processing (DLP), and Liquid Crystal on Silicon (LCoS) technologies.

10. The shutter according to claim 1, wherein the selected angle is 45 degrees.

11. A liquid crystal shutter, comprising:
    a liquid crystal based variable retarder, wherein the variable retarder includes a retarder transmission axis;
    a linear polarizer placed in series with an output light path of the variable retarder and wherein the polarizer includes a polarizer transmission axis parallel to an axis of polarization of an input S polarized light input to an input of the variable retarder and wherein the retarder transmission axis is set at selected angle to the polarizer transmission axis; and
    an electronic video image analyzer circuit coupled to the variable retarder and polarizer and including circuitry to adjust the retarder to a variable amount of retardation between a fully unenergized state and a fully energized state wherein the variable retardation varies between 0 lambda retardation and ½ lambda retardation in correlation to a contrast ratio of a current video image.

12. The liquid crystal shutter according to claim 11, wherein the liquid crystal shutter is positioned adjacent to a light modulator of the video light engine.

13. The liquid crystal shutter according to claim 11, wherein the light engine comprises one of high temperature polysilicon, Digital Light Processing (DLP), and Liquid Crystal on Silicon (LCoS) technologies.

* * * * *